Aug. 1, 1944. E. H. SHAFF 2,354,841
OPERATION CONTROLLING MEANS FOR PRESSURE FLUID ACTUATED TOOLS
Original Filed Nov. 4, 1937 2 Sheets-Sheet 1

INVENTOR
Ernest H. Shaff
By Parker, Carlson, Pitzner & Hubbard
ATTORNEYS

Inventor
Ernest H. Shaff
By Parker, Carlson, Pitzner & Hubbard
Attorneys

Patented Aug. 1, 1944

2,354,841

UNITED STATES PATENT OFFICE 2,354,841

OPERATION CONTROLLING MEANS FOR PRESSURE FLUID ACTUATED TOOLS

Ernest H. Shaff, Grand Haven, Mich., assignor to Keller Tool Company, Grand Haven, Mich., a corporation of Michigan Original application November 4, 1937, Serial No. 172,681, now Patent No. 2,313,843, dated March 16, 1943. Divided and this application December 7, 1939, Serial No. 307,980

11 Claims. (Cl. 121—38)

This invention relates to operation controlling means for pressure fluid actuated tools and more particularly concerns valve mechanism adapted for controlling the working cycle of a piston-actuated pneumatic tool such as a compression riveter.

The present application is a division of my co-pending application Serial No. 172,681 filed November 4, 1937, now Patent No. 2,313,843, issued March 16, 1943.

A general object of the invention is to provide novel mechanism adapted to govern a pressure fluid actuated tool for single cycle operation.

Another object is to provide pressure-fluid-responsive mechanism of this kind for governing the movements of the tool through an operating cycle and then automatically halting the tool.

A further object of the invention is to provide control mechanism of the foregoing general character which becomes automatically reconditioned or reset at the end of each operating cycle.

Still another object of the invention is to provide improved means for governing the pressure fluid responsive driving assembly of a compression riveter to operate the ram thereof selectively through a complete working cycle including a compression stroke and an instantaneously succeeding return stroke, and to stop the ram at the end of the cycle even though the pressure fluid supply has not been shut off.

Other objects and advantages will become apparent in the following description and from the accompanying drawings in which.

Figure 1:
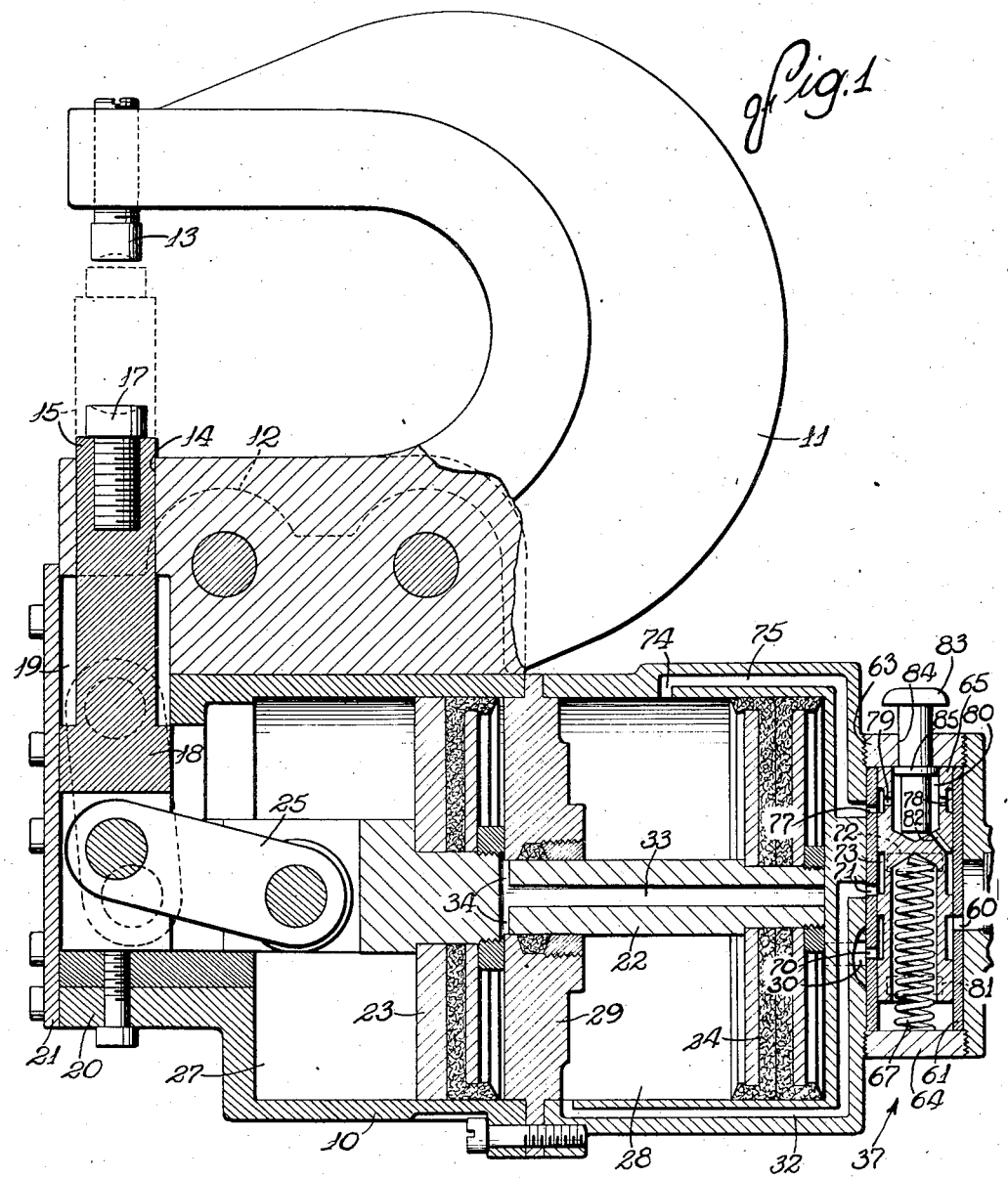
Figure 1 is a fragmentary elevational view, partially in longitudinal vertical section, of a riveting tool embodying features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The pressure-fluid-actuated tool selected for purposes of illustration in connection with the invention is a compression riveter (Fig. 1) which includes an elongated piston-chamber housing or barrel 10 near one end of which is mounted in laterally projecting relation a riveting yoke 11 having one arm anchored rigidly between spaced parallel ears 12 upon the barrel. The outer arm of the yoke carries an adjustable, stationary anvil or rivet set 13, while the attached or base arm of the yoke has a bore 14 in the forward end thereof serving as the bearing guide for an elongated reciprocal compression ram 15 carrying a rivet set 17. The ram has an inner end or base section 18 of rectangular cross section which slides within a suitable forwardly opening recess 19 formed within a reduced front nose portion 20 upon the barrel 10 and closed by a bearing plate 21.

For driving the ram 15 to carry the movable rivet set 17 toward the stationary rivet set 13, a piston assembly including a right angularly disposed piston rod 22, carrying front and rear pressure-fluid-actuated tandem pistons 23 and 24, respectively, is connected at its forward end to the ram base 18 by means of a driving link 25. The pistons are respectively located within front and rear cylindrical piston chambers 27 and 28 in the barrel 10 separated by a partition 29 through which the piston rod 22 extends slidably.

Pressure fluid such as compressed air for driving the pistons is delivered from any suitable source through the rear wall of the barrel 10 which for this purpose has a delivery port 30 communicating with the rear end of the piston chamber 28 and another delivery port 31 (Fig. 2) which communicates through a duct 32 in the wall of the barrel with the forward end of the chamber 28. Pressure fluid admitted through the port 30 drives the piston assembly forwardly in a riveting stroke while pressure fluid admitted through the port 31 and the duct 32 actuates the piston assembly in a return stroke. The driving pressure fluid is conducted from the rear piston chamber 28 to the rear end of the piston chamber 27 through an axial passage 33 and lead-off or distributor ports 34 in the piston rod 22.

Figure 2:
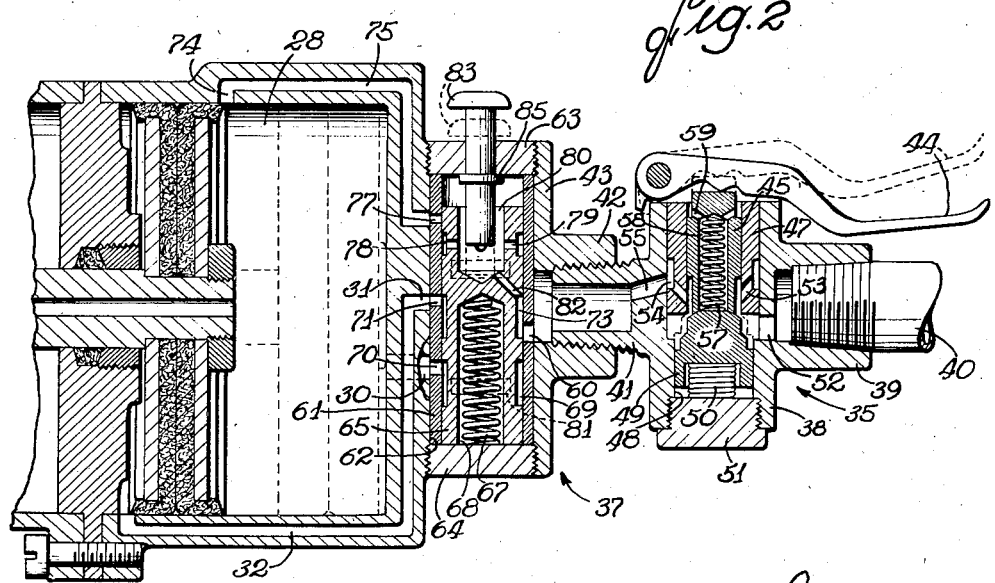
Fig. 2 is a fragmentary longitudinal vertical sectional view through the rear portion of the tool, showing the working parts in the relative positions assumed at the end of a power stroke in the operating cycle of the tool.

According to the present invention the pressure fluid supply for the tool is controlled by a combination of manual and pressure-fluid-responsive control valve mechanisms, generally identified at 35 and 37, respectively, operating in series between the source of supply and the delivery ports 30 and 31 (Figs. 1 and 2). Herein the valve mechanism 35 comprises a self-contained unit housed within a casing 38 one side of which has an inlet boss 39 with which is connected the delivery end of a pressure fluid conduit 40. The pressure fluid is conducted from the casing 38 through a nipple 41 projecting therefrom into threaded engagement within a boss 42 at the rear of a hollow casing 43 which houses the valve mechanism 37 and is preferably formed integrally with the rear wall of the barrel 10.

The manual control valve mechanism 35 is preferably of the type which not only controls the delivery of the pressure fluid supply but also functions to relieve the tool of any remaining pressure fluid after the live pressure fluid supply has been discontinued. On the other hand the pressure-fluid-responsive valve mechanism 37 acts as an automatic controller operative automatically in a cycle timed with respect to the operating cycle of the piston assembly to direct the pressure fluid admitted through the manual valve mechanism 35 first through the delivery port 30 to drive the piston assembly forwardly in a power or riveting stroke and then through the delivery port 31 to return the piston assembly to starting position. At the end of the operating cycle the controller acts to halt operation of the tool until the pressure fluid control system is reconditioned by closing of the manual valve mechanism.

Operation of the manual control valve mechanism 35 is effected by means of a suitable handle 44 which is pivotally mounted upon the casing 38 to bear against the outer end of a slidable valve plunger 45. A bushing 47 fixedly secured within a bore 48 intersecting the axis of the boss 39 provides a bearing for the plunger. The bushing 47 is shorter than the bore 48 and at its inner end serves as the seat for a valve member 49 which is normally urged into seating relation (in broken outline in Fig. 2 and in full line in Fig. 3) by a compression spring 50 that bears against a screw plug 51 closing the adjacent end of the bore 48. The inner end of the plunger 45 is adapted to bear sealingly against the seating face of the valve member 49 when the plunger is forced inwardly by the handle 44, as shown in full line position in Fig. 2, to unseat the valve member 49. By thus opening the valve, a passageway is opened for pressure fluid from the boss 39 through a port 52 past the valve member 49 and through a series of ducts 53 and an annular circumferential groove 54 in the bushing 47 to a duct 55 leading into the nipple 41. Upon releasing the handle 44 the valve member 49 is reseated to shut off the pressure fluid supply. At the same time the plunger 45 is unseated from the valve member 49 by a compression spring 57 acting within an axial bore 58 in the plunger (Fig. 3) and bearing against the valve member. This opens a relief vent to atmosphere through the bore 58 and a series of vent openings 59 near the head end of the plunger 45 through which pressure fluid trapped in the system ahead of the valve 49 is released, the plunger thus serving as an auxiliary or relief valve.

Live pressure fluid passed by opening of the valve mechanism 35 enters the casing boss 42 of the automatic controller and passes through an inlet port 60 into a barrel or cylinder 61 which is fixedly secured within a bore 62 in the governor casing 43. The opposite ends of the cylinder 61 are closed by closure disks 63 and 64, respectively, which may be threaded into the opposite ends of the bore 62. Within the cylinder 61 is a longitudinally reciprocable governor plunger or piston valve body 65 which is normally urged by resilient means such as an expansile compression spring 67 into initial position (Fig. 1) wherein one end of the valve body may abut one of the closure disks, herein the closure disk 63. The spring 67 may be seated within an axial bore 68 in the valve body 65 and bears against the closure disk 64.

The pressure fluid which enters through the port 60, while the valve body 65 is in the initial position (Fig. 1), is directed through a registering annular circumferential groove 69 in the valve body and passes from the groove through a discharge port 70 in the cylinder wall communicating with the delivery port 30 at the rear of the piston barrel. The pressure fluid thus becomes effective to drive the pistons forwardly in a power or riveting stroke.

While the pistons are traveling forwardly the air in front of the forward piston 23 is exhausted to atmosphere through suitable openings (not shown). At the same time air in front of the rear piston 24 is exhausted through the duct 32 and the port 31 which registers with a suitable port 71 in the valve cylinder 61. The exhausting air escapes to atmosphere from one side of the valve cylinder through an exhaust port 72 (Figs. 1 and 4) which is placed in communication with the port 71 by a circumferential annular groove 73 in the valve body 65.

Figures 3, 4:
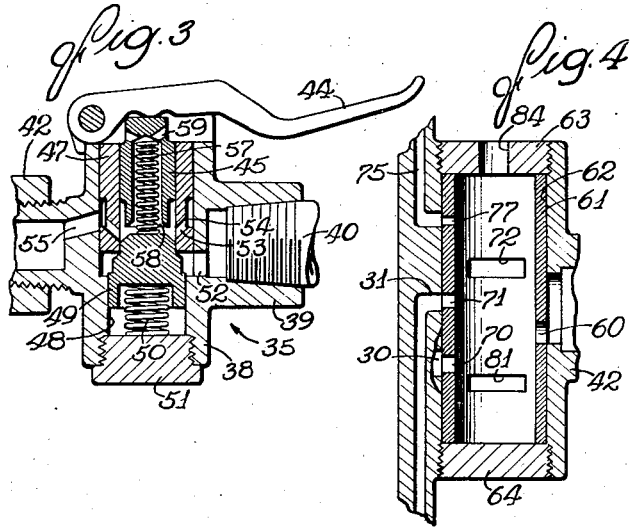
Fig. 3 is a fragmentary sectional view taken in the same plane as Fig. 2 showing the manual control valve mechanism in the closed condition thereof.
Fig. 4 is a fragmentary vertical sectional elevational view through the governor valve housing with the governor valve body removed.
Figure 5:
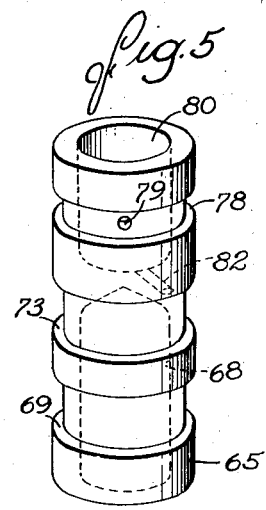
Fig. 5 is a perspective view of the governor valve body, on a larger scale.

When the driving pistons have substantially reached the forward end of the power stroke, the rear piston 24 uncovers a port 74 located at a predetermined intermediate point of the side wall of the rear piston chamber 28. Thereupon, live pressure fluid immediately passes through the port 74 and a suitable passageway 75 formed in the side and end walls of the piston barrel to communicate by way of a port 77 in the wall of the valve cylinder 61 with an annular peripheral groove 78 (Fig. 1) and a series of ports 79 in the valve body 65. The port 77 is preferably in the form of a slot extending across the adjacent mouth of the passageway 75, but it may be round or any other suitable shape. The ports 79 open into a chamber or pocket 80 which is formed as a short axial bore in that end of the valve body 65 which opposes the closure disk 63. Upon reaching the pocket 80, the live pressure fluid is trapped and develops sufficient force amounting to a quick contra-bias impulse to overcome and compress the spring 67 and force the valve body 65 away from the closure disk 63 toward abutment with the opposite closure disk 64. As a result, the valve body groove 73 is carried out of register with the exhaust port 72 and into registration with the pressure fluid inlet port 60, while the groove 69 is moved out of register with the inlet port 60 and into registration with an exhaust port 81 opening to atmosphere from the valve cylinder 61 in spaced relation to the exhaust port 72 (Figs. 1, 2 and 4). As this change is effected, the live pressure fluid passes by way of the groove 73, the ports 71 and 31 and the duct 32 to the forward end of the rear piston chamber 28 to return the pistons to the starting position (shown in full line in Fig. 1 and in broken outline in Fig. 2).

Upon shifting of the valve body 65 into the piston-reversing position, a solid peripheral area of the valve body closes the port 77 (Fig. 2) and live pressure fluid is admitted into the pocket 80 through a small pressure fluid duct 82 which communicates with the valve body groove 73. The duct 82 is preferably smaller in cross-sectional flow area than the port 77 so that even though a small amount of pressure fluid entering by way of the port 77 may escape initially through the duct 82, the channel 73 and the exhaust port 72, yet such escape is retarded by the flow differential between the port 77 and the duct 82. Frictional resistance to passage of the pressure fluid due to the length of the duct 82 is another factor in the development of pressure within the pocket 80. In practice, shifting of the valve 65 has been found to be practically instantaneous. Thus, the pressure pocket is caused to remain active to hold the valve body 65 in shifted position from the beginning to the end of the return stroke of the pistons. At the end of the return stroke the tool will automatically come to a halt even though the manual control valve mechanism 35 remains open, because as long as live pressure fluid continues to be admitted to the governor valve mechanism the pressure pocket 80 continues to hold the valve body 65 against return to its initial position.

To effect a repetition of the operating cycle of the tool it is necessary to release the handle 44 to close the control valve member 49, and open the relief valve 45 so as to vent the pressure fluid from the pocket 80. This releases the spring 67 which returns the valve body 65 back to the initial position, thus completing the operating cycle of and reconditioning the controller mechanism 37 for a repetition of the cycle of tool operation.

Should the tool become stalled for any reason before the intermediate port 74 is uncovered by the rear piston 24, the valve body 65 may be manually shifted to reverse the pressure fluid delivery so as to return the driving pistons to their initial positions. Suitable means for this purpose comprises a release pin or plunger 83 which projects slidably through an axial aperture 84 in the closure disk 63 into the pocket 80. Intermediate its ends the release pin 83 is preferably provided with a retaining collar 85 which serves during normal operation as a seal to avoid pressure fluid leakage around the shank of the pin through the aperture 84. Longitudinal force applied to the valve body 65 by pressing the release pin 83 inwardly thereagainst (broken line position in Fig. 2) serves to compress the spring 67 and shift the valve body into piston-reversing position.

From the foregoing it will be apparent that the present invention provides a novel arrangement of valve mechanisms of inexpensive construction for efficiently controlling a pressure fluid operated tool for one-cycle operation. Even though the manually operated pressure fluid supply controlling valve may be held open longer than the completition of the operating cycle of the tool, the cycle governing mechanism positively halts the tool and requires closing of the manual control valve before the mechanism can be reconditioned for repetition of the operating cycle. Moreover, should the tool become stalled before the power stroke has been completed, the working parts can be quickly returned to the starting position by manual adjustment of the controller valve mechanism.

I claim as my invention:

1. A cycle governing mechanism for a riveting tool of the character described comprising a barrel, pressure fluid operated piston means and means for supplying piston-motivating pressure fluid; said cycle controlling mechanism including a reciprocable plunger valve and resilient means for normally urging said plunger valve into position to direct the pressure fluid to actuate said piston means in the driving stroke, said plunger valve having a chamber at one end thereof; and means communicating with said barrel for delivering pressure fluid from the barrel to said chamber at the end of said driving stroke to shift said plunger valve in opposition to said resilient means for directing the pressure fluid to return the piston means to starting position, and means controlled by the plunger valve when in its shifted position to connect said chamber with said source of pressure fluid whereby to hold the valve in its shifted position.

2. A pressure fluid actuated tool comprising, in combination, a pressure fluid responsive driving piston and a chamber for said piston, said chamber having an end wall including a port communicating with one end of the chamber for delivery of pressure fluid to drive said piston in one direction and another port communicating with the opposite end of said chamber for driving said piston in the opposite direction, a housing on said end wall in communication with said ports and having a pressure fluid inlet thereto, a reciprocable valve member within said housing adapted in one position to direct the pressure fluid from said inlet to said one port and in the other position to direct the pressure fluid from the inlet to the other port, means for normally urging said valve member into said one position, pressure fluid responsive means for urging said valve member into said second position, a passage communicating with said pressure fluid responsive means and with said chamber adapted to be opened for pressure fluid delivery from said chamber to said pressure fluid responsive means coincident with movement of said piston into a given position within said chamber, and means controlled by said valve member as an incident to its movement into said second position for placing said pressure fluid responsive means in direct communication with said inlet after said valve member has been moved to said second position.

3. A pressure fluid actuated tool comprising, in combination, a pressure fluid responsive driving piston and a chamber for said piston, said chamber having an end wall including a port communicating with one end of the chamber for delivery of pressure fluid to drive said piston in one direction and another port communicating with the opposite end of said chamber for driving said piston in the opposite direction, a housing on said end wall in communication with said ports and having a pressure fluid inlet thereto, a reciprocable valve member within said housing adapted in one position to direct the pressure fluid from said inlet to said one port and in the other position to direct the pressure fluid from the inlet to the other port, means for normally urging said valve member into said one position, pressure fluid responsive means for urging said valve member into said second position, a passage communicating with said pressure fluid responsive means and with said chamber adapted to be opened for pressure fluid delivery from said chamber to said pressure fluid responsive means coincident with movement of said piston into a given position within said chamber, means controlled by said valve member when in its shifted position for placing said pressure fluid responsive means in direct communication with said inlet after said valve member has been moved to said second position, and means for releasing pressure fluid from said pressure fluid responsive means at the end of a cycle of operation.

4. In a pressure fluid actuated tool having a cylinder and a piston reciprocable therein, a cycle controlling valve mechanism comprising a housing having an elongated cylindrical chamber therein closed at the opposite ends and including an inlet port and a pair of delivery ports as well as a pair of exhaust ports in its longitudinal wall, said inlet port communicating with a source of pressure fluid and said delivery ports being connected respectively with the opposite ends of said cylinder, a plunger within said chamber having a limited range of longitudinal sliding movement, pressure fluid channels in said plunger for alternately effecting communication of said delivery ports with said inlet port or with said exhaust ports, said plunger having an axial bore formed within one end and a pocket formed within the other end, a spring seated within said bore and bearing against the adjacent closure of the chamber for normally urging said plunger toward the opposite closure of the chamber, and means for effecting communication at one point in the cycle of operation with one side of the driving piston and with said pocket to create a pressure fluid force opposing said spring to shift said plunger to the opposite end of said chamber.

5. In a pressure fluid actuated tool having a cylinder and a piston reciprocable therein, a cycle control valve mechanism comprising a housing having an elongated chamber therein closed at the opposite ends and including an inlet port and a pair of delivery ports as well as a pair of exhaust ports in its longitudinal wall, said inlet port communicating with a source of pressure fluid and said delivery ports being connected respectively with the opposite ends of said cylinder, a plunger within said chamber having a limited range of longitudinal sliding movement, pressure fluid channels in said plunger for alternately effecting communication of said delivery ports with said inlet port or with said exhaust ports, said plunger having an axial bore formed within one end and a pocket formed within the other end, a spring seated within said bore and bearing against the adjacent closure of the chamber for normally urging said plunger toward the opposite closure of the chamber, means for effecting communication at one point in the cycle of operation with one side of the driving piston and with said pocket to create a pressure fluid force opposing said spring to shift said plunger to the opposite end of said chamber, means on said plunger for shutting off said communication when said plunger is thus shifted, and means operative coincident with said shut-off means to provide a direct passage to said inlet for conducting live pressure fluid into said pocket after said communication-effecting means has been shut off.

6. In a pressure fluid operated tool having a cylinder and a piston to be driven in a single continuous cycle and then halted in the starting position, a cycle controlling device including an elongated chamber communicating with a controlled source of pressure fluid and with the opposite ends of said cylinder, a reciprocable plunger within said chamber constructed to control the flow of pressure fluid alternately to the opposite ends of the cylinder in accordance with the position of the plunger adjacent to the respective opposite ends of the chamber, means normally biasing said plunger for movement into position at one end of the chamber for delivering pressure fluid to the rear end of the cylinder, said plunger having a pocket at the end thereof adjacent said one end of the chamber, means operative as an incident to completion of the forward stroke of the piston for delivering pressure fluid to said pocket to effect a shifting of the plunger in opposition to said biasing means, the last mentioned means including a passage closed upon such shifting of the plunger, a duct leading from said pocket arranged for entering into direct communication with the pressure fluid source coincident with closing of said passage whereby to maintain live pressure fluid force within said pocket continuously until the supply of pressure fluid is discontinued, and means for exhausting the pressure fluid from said pocket upon discontinuance of the pressure fluid supply.

7. A cycle controlling valve mechanism for a pressure fluid tool having a chamber, a piston reciprocable in said chamber and a source of pressure fluid; said mechanism comprising a housing; a valve member movable within predetermined limits in said housing and operative when in one limit position to direct pressure fluid into the piston chamber to drive the piston forwardly and when in the opposite limit position to direct the pressure fluid into the piston chamber for returning the piston to starting position; means normally biasing said valve member toward said one limit position; means controlled by the piston in its forward stroke operative to subject said valve member to a momentary impulse of pressure fluid to shift said valve member toward said opposite limit position; and means controlled by such shifting of the valve member into said opposite position to direct live pressure fluid from said source against said valve member to continue to hold it in its shifted position.

8. In a pressure fluid actuated tool, the combination with a cylinder having a piston chamber, a piston therein and a source of pressure and a throttle valve therefor, of a single-stroke valve mechanism comprising a valve casing, a valve member in said casing, a spring acting on said valve member to hold it in a normal position, means controlled by said valve member when in said normal position to admit pressure fluid from said source to the rear end of said piston chamber to drive the piston forwardly therein, said valve member having a pressure area subject to the action of pressure fluid to effect movement of the valve member into a shifted position against the action of said spring, means operative when the piston is in its forward position in the piston chamber to effect the admission of pressure fluid from said chamber to said pressure area on the valve member and cause the valve member to be moved into its shifted position, means controlled by the valve member in its shifted position to admit pressure fluid to the forward end of the piston chamber to return the piston, and means also operative as an incident to the movement of said valve member into its shifted position to subject said valve member to the action of live pressure fluid whereby to hold the valve member shifted so long as the throttle valve remains open.

9. In a pressure fluid actuated tool, the combination with a cylinder having a piston chamber, a piston therein and a source of pressure and a throttle valve therefor, of a single-stroke valve mechanism comprising a valve casing, a valve member in said casing, a spring acting on said valve member to hold it in a normal position, means controlled by said valve member when in said normal position to admit pressure fluid from said source to the rear end of said piston chamber to drive the piston forwardly therein, said valve member having a pressure area subject to the action of pressure fluid to effect movement of the valve member into a shifted position against the action of said spring, means for supplying pressure fluid from said chamber to said pressure area on the valve member to cause the valve member to be moved into its shifted position, means controlled by the valve member in its shifted position to admit pressure fluid to the forward end of the piston chamber to return the piston, and means also operative as an incident to the movement of said valve member into its shifted position to subject said valve member to the action of live pressure fluid whereby to hold the valve member shifted so long as the throttle valve remains open.

10. In a pressure fluid actuated tool, the combination with a cylinder having a piston chamber, a piston therein, and a source of pressure and a throttle valve therefor, of a single-stroke valve mechanism comprising a valve casing, a valve member in said casing, a spring acting on said valve member to hold it in a normal position, said valve in said normal position having open passages for admitting pressure fluid from said source to one end of said piston chamber to drive the piston toward the other end of said chamber, said valve member having a pressure area subject to the action of pressure fluid to effect movement of the valve member into a shifted position against the action of said spring, means for supplying pressure fluid from said one end of said piston chamber to said pressure area on the valve member to cause the valve member to be moved into its shifted position, means controlled by the valve member in its shifted position to admit pressure fluid to said other end of the piston chamber to return the piston, and means also operative as an incident to the movement of said valve member into its shifted position to subject said valve member to the action of live pressure fluid whereby to hold the valve member shifted so long as the throttle valve remains open.

11. In a pressure fluid actuated tool, the combination with a cylinder having a piston reciprocable therein, and a source of pressure fluid and a throttle valve therefor, of a single stroke valve mechanism shiftable to control the flow of pressure fluid from said source to either end of said cylinder, said mechanism including a valve member spring urged to a normal position and having passages in said position for admitting pressure fluid to one end of said cylinder, and other passages established in the shifted position of said valve member for admitting pressure fluid to the other end of said cylinder, pressure fluid responsive means for shifting said valve against the spring load thereon, and plural passages alternately opened by said valve mechanism for subjecting said pressure fluid responsive means to live pressure fluid first from the cylinder end to which pressure fluid is admitted by said valve member in the normal position thereof and next directly from said source after said valve member has been shifted by the first admitted pressure fluid, said valve member being held in shifted position by the last admitted pressure fluid so long as said throttle valve is open.

ERNEST H. SHAFF.